(12) United States Patent
Kingsbury et al.

(10) Patent No.: US 10,816,350 B2
(45) Date of Patent: Oct. 27, 2020

(54) RESTRICTING TRAVEL FOR VEHICLE PASSENGERS

(71) Applicant: Lenovo (Singapore) Pte. Ltd., Singapore (SG)

(72) Inventors: Timothy Winthrop Kingsbury, Cary, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 15/243,329

(22) Filed: Aug. 22, 2016

(65) Prior Publication Data

US 2018/0051999 A1 Feb. 22, 2018

(51) Int. Cl.

| G01C 22/00 | (2006.01) |
| G05D 1/00 | (2006.01) |
| G01C 21/34 | (2006.01) |
| H04W 4/021 | (2018.01) |
| G06Q 50/30 | (2012.01) |
| G05D 1/02 | (2020.01) |
| G06Q 10/02 | (2012.01) |
| H04W 4/48 | (2018.01) |

(52) U.S. Cl.
CPC ..... *G01C 21/3461* (2013.01); *G01C 21/3484* (2013.01); *G05D 1/021* (2013.01); *G05D 1/024* (2013.01); *G05D 1/0214* (2013.01); *G06Q 10/02* (2013.01); *G06Q 50/30* (2013.01); *H04W 4/021* (2013.01); *H04W 4/48* (2018.02); *G05D 2201/0213* (2013.01)

(58) Field of Classification Search
None
See application file for complete search history.

(56) References Cited

U.S. PATENT DOCUMENTS

| 4,982,072 A * | 1/1991 | Takigami | B60R 25/04 |
| | | | 235/382 |
| 7,327,242 B2 * | 2/2008 | Holloway | B60R 25/24 |
| | | | 180/170 |
| 7,956,730 B2 * | 6/2011 | White | A61B 5/117 |
| | | | 180/272 |
| 8,660,734 B2 * | 2/2014 | Zhu | G05D 1/0214 |
| | | | 701/23 |
| 8,688,306 B1 * | 4/2014 | Nemec | G05D 1/0055 |
| | | | 104/250 |
| 9,139,091 B1 * | 9/2015 | Penilla | G08G 1/205 |
| 9,194,168 B1 * | 11/2015 | Lu | E05F 15/70 |
| 9,196,143 B2 * | 11/2015 | Lin | G01C 21/3688 |
| 9,229,905 B1 * | 1/2016 | Penilla | G06F 17/00 |
| 9,599,477 B1 * | 3/2017 | Aula | G01C 21/26 |

(Continued)

FOREIGN PATENT DOCUMENTS

| CN | 103370249 A | 10/2013 |
| CN | 104021656 A | 9/2014 |

(Continued)

*Primary Examiner* — Harry Y Oh
(74) *Attorney, Agent, or Firm* — Ference & Associates LLC

(57) ABSTRACT

One embodiment provides a method, including: obtaining, using a processor, a user identification of a vehicle passenger; obtaining, based on the user identification, a travel restriction; and providing, to a vehicle, an indication of the travel restriction. Other aspects are described and claimed.

20 Claims, 4 Drawing Sheets

(56) References Cited

U.S. PATENT DOCUMENTS

| | | | |
|---|---|---|---|
| 9,631,933 B1* | 4/2017 | Aula | G01C 21/20 |
| 2001/0037174 A1* | 11/2001 | Dickerson | G06Q 50/30 |
| | | | 701/400 |
| 2006/0082437 A1* | 4/2006 | Yuhara | B60R 25/04 |
| | | | 340/5.82 |
| 2008/0195428 A1* | 8/2008 | O'Sullivan | G06Q 50/30 |
| | | | 705/6 |
| 2009/0287367 A1* | 11/2009 | Salinger | G05D 1/0246 |
| | | | 701/23 |
| 2011/0137520 A1* | 6/2011 | Rector | H04M 1/72577 |
| | | | 701/36 |
| 2012/0157052 A1* | 6/2012 | Quade | H04L 63/0853 |
| | | | 455/411 |
| 2016/0247094 A1* | 8/2016 | Scicluna | G06Q 10/02 |
| 2016/0247095 A1* | 8/2016 | Scicluna | G06Q 10/02 |
| 2016/0301698 A1* | 10/2016 | Katara | G07B 13/02 |

FOREIGN PATENT DOCUMENTS

| | | |
|---|---|---|
| CN | 104104807 A | 10/2014 |
| CN | 105046942 A | 11/2015 |

\* cited by examiner

RESTRICTING TRAVEL FOR VEHICLE PASSENGERS

BACKGROUND

Self-driving cars and ride sharing technologies such as UBER and LYFT services eliminate the need for individuals to possess driving skills and a driver's license. This opens up the possibility of minors and other users to have unrestricted travel. Similar problems also occur with taxi cab services and public transportation services (busses, trains, etc.). UBER is a registered trademark of Uber Technologies, Inc., in the United States and other countries. LYFT is a registered trademark of Lyft, Inc., in the United States and other countries.

Currently, automobile use is restricted by possession of the keys, whereas public transportation services are restricted by possession of tickets. These restrictions can be unreliable, e.g., if keys or tickets are obtained by a minor. In the case of self-driving cars, it could be very difficult to restrict access. Similarly, while ride sharing services typically do not allow unsupervised minors, this can be difficult to enforce.

BRIEF SUMMARY

In summary, one aspect provides a method, comprising: obtaining, using a processor, a user identification of a vehicle passenger; obtaining, based on the user identification, a travel restriction; and providing, to a vehicle, an indication of the travel restriction.

Another aspect provides a device, comprising: a display screen; a processor operatively coupled to the display screen; and a memory that stores instructions executable by a processor to: obtain a user identification of a vehicle passenger; obtain, based on the user identification, a travel restriction; and provide, to a vehicle, an indication of the travel restriction.

A further aspect provides a system, comprising: a storage device comprising code that is executable by a processor, the code comprising: code that obtains a user identification of a vehicle passenger; code that obtains, based on the user identification, a travel restriction; and code that provides, to a vehicle, an indication of the travel restriction.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
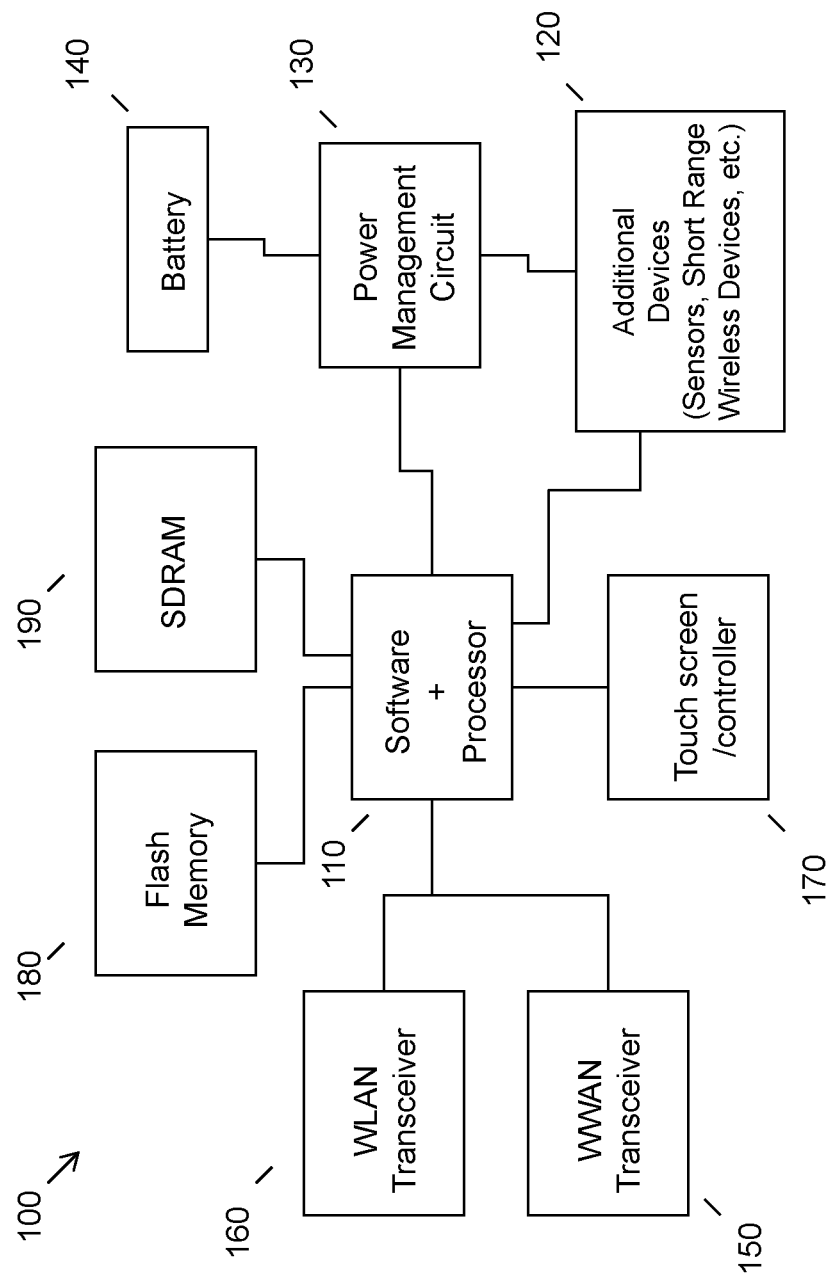
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides a travel restriction, e.g., in the form of a restricted license, to restrict travel of particular users, e.g., restricting travel of minors. The restrictions or restricted license may be configured by a caregiver, e.g., a parent or guardian.

An embodiment restricts user access to a vehicle, e.g., a self-driving car or vehicle service, in a variety of ways. For example, by implementing a restriction using an embodiment, only specific travel locations may be permissible, only travel locations within a specific city or radius or geographic area may be permissible, only travel during specific times or days may be permissible, only travel for single or well-defined trips may be permissible, and/or only travel having a trusted pickup (e.g., grandparent) or endpoint may be permissible.

The restrictions or restricted license is provided in a variety of forms including car keys, identification cards, or smart phone applications. The restrictions or restricted license may be applied to self-driving cars but is equally applicable to taxi cabs, ride-sharing services, and public transit services.

An embodiment provides a notification, e.g., to a vehicle operator, of a travel restriction based on the identification of the passenger.

An embodiment provides a restriction, e.g., to a navigation system of an automated vehicle, that adjusts the operation of the vehicle.

The illustrated example embodiments will be best understood by reference to the figures. The following description is intended only by way of example, and simply illustrates certain example embodiments.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera and/or other imaging device, e.g., an infrared sensor, etc., as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
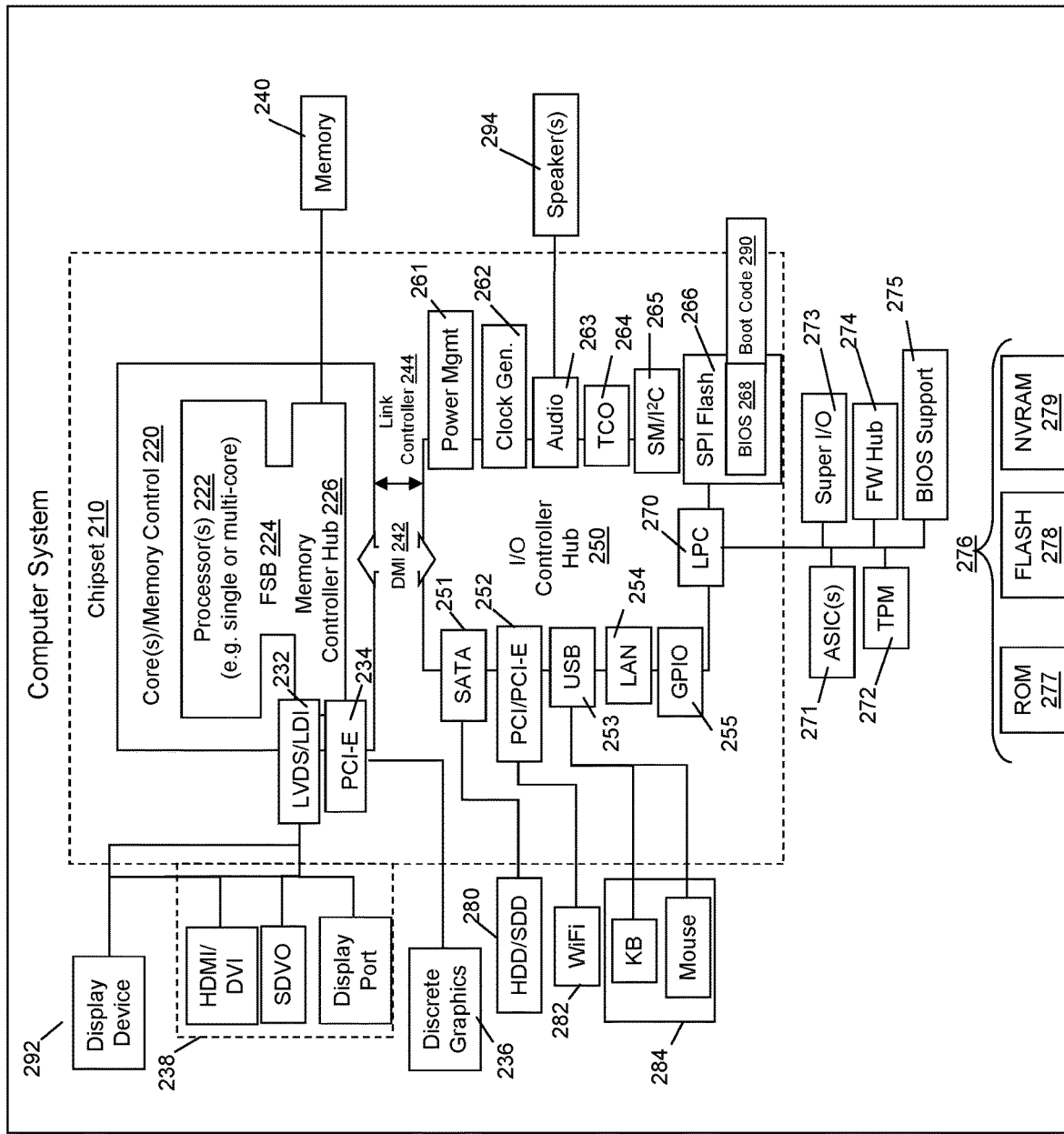
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as a computing device that is located within or that communicates with a vehicle, e.g., an automated vehicle such as a driverless car, a public transportation service vehicle such as a train, or a ride sharing vehicle operated by another party, e.g., a hired driver. In an embodiment, the circuitry outlined in FIG. 1 may for example be included in a mobile device such as a smart phone or tablet used by a vehicle operator such as a hired driver, or a mobile device such as a smart phone or tablet used by a passenger, or both. In an embodiment, the circuitry outlined in FIG. 2 may for example be included in an onboard computer of a vehicle such as a driverless car, a public transportation vehicle such as a train, or a ride sharing vehicle operated by another party, e.g., a hired driver.

Figure 3:
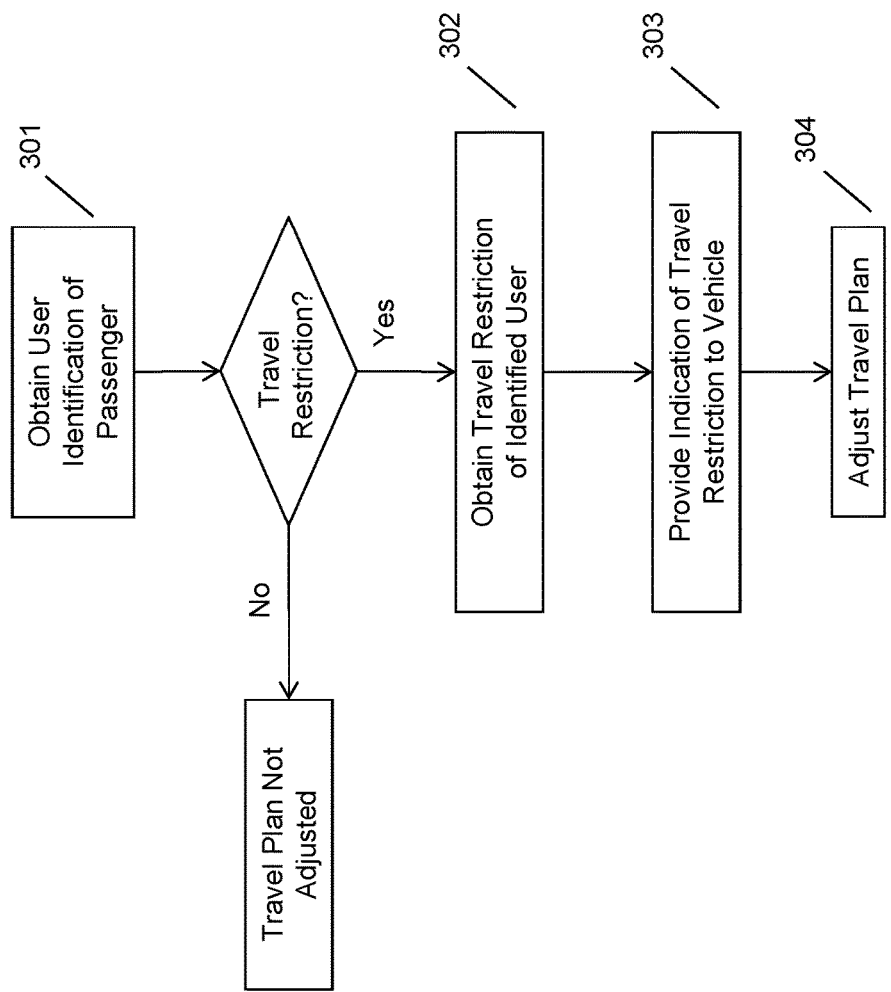
FIG. 3 illustrates an example method of restricting travel for vehicle passengers.

Turning to FIG. 3, an embodiment obtains a user identification of a vehicle passenger at 301. The user identification may be obtained at 301 using a variety of techniques. For example, the user identification may be obtained locally by a device at 301. By way of specific example, a user may provide identification data to his or her mobile computing device, e.g., a smart phone running a transportation application, where such identification data is thereafter communicated to another device, e.g., a remote server or a vehicle onboard computer. Alternatively, an embodiment may obtain the user identification at 301 by contacting a remote device. For example, a user may authenticate to a local device and the identification data may be stored on a remote device such a server. The identification data may thereafter be obtained, at 301, by a vehicle computing device that contacts the remote server. Furthermore, an embodiment may obtain, at 301, the user identification directly. For example, a user may provide identification data directly to the vehicle's on board computer or to a device located within the vehicle, e.g., a mobile computing device such as a smart phone or tablet computer utilized by the vehicle operator.

The user identification obtained at 301 may comprise other data, e.g., a travel request from the user. That is, the user may provide identification data and a travel request (e.g., requested route) in the same submission.

Having user identification data, an embodiment obtains, at 302, a travel restriction for the user. The travel restriction data may be obtained, at 302, either by communication with a local device or, as with the user identification data, by communicating with a remote device. For example, an embodiment may obtain, at 302, a user's profile that includes preconfigured travel settings therein, including one or more travel restrictions. By way of specific example, a vehicle's onboard computer or a device within the vehicle, e.g., a hired driver's mobile device such as a smart phone, may obtain, at 302, a user's profile and travel restriction(s), if any, from a remote server based on the user identification data.

An embodiment therefore may provide, at 303, an indication of the travel restriction to the vehicle. The indication may take a variety of forms including but not limited to a display on an onboard display screen within the vehicle. The indication may be provided on a display screen such that the vehicle operator is aware that the passenger is subject to a travel restriction. The indication may take other forms. For example, the indication may be provided at 303 by sending a notification to predetermined devices, e.g., a hired driver's mobile device such as a smart phone, the passenger's mobile device such as a smart phone, etc.

In the case where the vehicle is an automated vehicle, e.g., a driverless car, an automated tram or train, etc., the provision of an indication of a travel restriction to the vehicle, at 303, may include an adjustment to a travel plan, as illustrated at 304. For example, a travel plan requested by the passenger may be adjusted at 304 based on the restriction. By way of specific example, a navigation application's route may be automatically altered, changed or cancelled based on the travel restriction(s) indicated for the particular passenger. By way of further example, a travel plan may be adjusted such that it complies with the travel restriction, e.g., by restricting travel to a specific geographic area, restricting travel to a time window, restricting travel to a trip type (e.g., short trip), and/or restricting travel to a defined end point (e.g., predetermined end point, predetermined pickup individual, etc.).

In the case of a defined endpoint, including a predetermined pickup individual, a passenger's ride in a driverless car might be conditioned on the detection of the defined endpoint. For example, where a trusted pickup is required to be on the receiving side or at the endpoint of a trip, according to a user's travel restriction settings, an embodiment may require such trusted pickup to be detected prior to ending a currently pending travel plan, whereas, if the trusted pickup is not detected, the travel plan may be altered. For example, this may include a scenario where a minor passenger is being sent alone to a specific location, e.g., his or her grandparents' house. Once an automated vehicle reaches the destination, the grandparent(s) may be notified, e.g., by wireless communication to one or both of their mobile devices. Identification that the defined endpoint has been achieved may include requiring input from one of the grandparents at the automated vehicle, e.g., input may be presented from a particular individual or a device associated with that particular individual to unlock the automated car and conclude the currently pending travel plan. The identification of the particular individual may include biometric identification, e.g., using a biometric sensor of the car. Other identification techniques may be utilized.

If the endpoint transaction was not handled properly, e.g., a specific individual or geographic location was not identified by the automated vehicle within a predetermined amount of time, other caregivers of the minor passenger (e.g., the passenger's the parents) may be notified, e.g., by wireless communication to one or both of the parents' mobile devices, and the travel plan may be automatically adjusted, e.g., to take the minor passenger back to the trip's origin point or to an alternative location.

The passenger need not be a human being; rather, an embodiment may be utilized to transport animals, cargo and/or other objects. By way of example, a pet dog may be sent on a predetermined route, e.g., to the veterinarian's office. A suitable self-driving vehicle with a dog-appropriate crate delivers the pet dog to the veterinarian's office according to the predetermined route. The pet dog and requested travel route may be identified in a variety of ways in order to retrieve the travel restrictions/plan for the pet dog. By way of example, a human owner of the dog may communicate this information to the automated vehicle's navigation system, an RFID tag worn by the pet dog may be used to supply user identification data, e.g., as illustrated at 301, which is thereafter utilized to retrieve a travel plan, travel restrictions, etc.

Similarly, upon arrival, the staff at the veterinarian's office is notified, e.g., via wireless communication, and a veterinary office staff member presents identification data to unlock the automated vehicle and crate to end the pending trip. As described herein, if a travel restriction is not handled properly within a reasonable amount of time, the pet dog's owner is notified, e.g., by wireless communication to his or her device, and the pet dog's pending travel plan is adjusted, e.g., the pet dog is returned back home.

Figure 4:
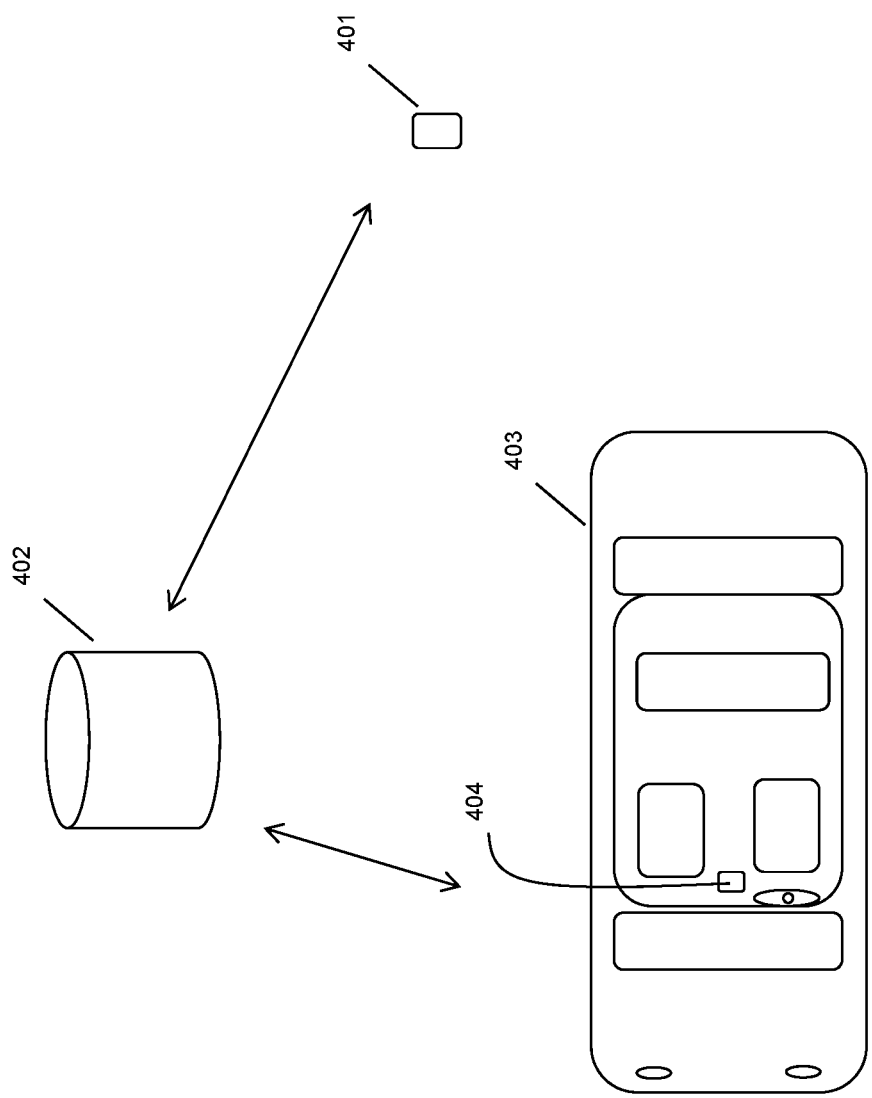
FIG. 4 illustrates an example system for restricting travel for vehicle passengers.

FIG. 4 illustrates an example system for restricting travel for vehicle passengers. As shown, in an embodiment a user may operate a local device 401, e.g., a mobile device such as a smart phone, in order to request travel, identify himself or herself, and communicate this data to a remote server 402. The remote server 402 in turn may relay the requested travel to a vehicle 403, e.g., an automated vehicle, and/or to a mobile device of a vehicle operator 404, e.g., a hired driver's smart phone.

The remote server 402 may also locate the user's travel restrictions, if any, based on the user identification received from the local device 401. Thus, the remote server 402 may communicate any travel restrictions that apply to the user, e.g., communicated to the vehicle 403 and/or an operator's mobile device 404. This alerts the vehicle 403 and/or the vehicle's operator that the potential passenger is subject to one or more travel restrictions. This may preclude the user from using the vehicle 403 for travel.

If a travel restriction is communicated by the remote server 402 to the vehicle 403 and/or the vehicle operator's mobile device 404, a travel plane corresponding to the initial travel request may be adjusted, changed or cancelled. By way of example, the remote server 402 may provide a travel restriction regarding a particular time of day or a particular geographic area. The vehicle's 403 onboard computer and/or the vehicle operator's mobile device 404 may acknowledge the travel restriction received from the remote server 402 and provide an appropriate indication, e.g., automatically displaying the travel restriction, automatically adjusting the travel plan, or a combination of the foregoing. In an embodiment, the remote server 402 may act to proactively adjust the travel plan based on a travel restriction indicated for the user.

In an embodiment, the vehicle 403 and/or the vehicle operator may make certain changes or adjustments to the travel plan to ensure that the travel restriction is complied with. For example, the vehicle 403 may automatically adjust a navigation system to ensure the route taken complies with both the travel restriction that requires a route to stay within a predetermined area and the requested travel to a particular destination.

Accordingly, an embodiment provides an intelligent, automated system for restricting travel of certain passengers. Using an embodiment, a passenger may travel in an automated or semi-automated fashion to given destinations while complying with any travel restrictions that have been imposed, e.g., by a parent or guardian.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining, using a processor, a user identification of a vehicle passenger of an automated vehicle, wherein the vehicle passenger does not operate the vehicle;
   obtaining, based on the user identification, a travel restriction associated with a route for the vehicle and an indication of a trusted pickup to receive the vehicle passenger at an endpoint of the route, the travel restriction, trusted pickup, and the endpoint of the route being identified by a non-passenger of the vehicle;
   providing, to a vehicle, an indication of the travel restriction;
   generating a travel plan for the vehicle based upon the travel restriction and the endpoint;
   providing, to the non-passenger of the vehicle, a notification of arrival at the endpoint using the travel plan and pickup of the vehicle passenger by the trusted pickup, wherein the non-passenger of the vehicle is located in a different location than the endpoint of the route and wherein the non-passenger is different from the trusted pickup; and
   receiving, responsive to arrival at the endpoint, an indication from the non-passenger of the vehicle to conclude the travel plan.

2. The method of claim 1, wherein the indication is for an automated vehicle.

3. The method of claim 2, wherein the automated vehicle is selected from the group consisting of an automobile and a train.

4. The method of claim 3, comprising adjusting a travel plan based on the restriction.

5. The method of claim 4, wherein the adjusting comprises implementing a restriction selected from the group consisting of: restricting travel to a specific geographic area; restricting travel to a time window; restricting travel to a trip type; and restricting travel to a defined end point.

6. The method of claim 5, wherein the defined end point comprises a requirement for a predetermined individual being present at the end point.

7. The method of claim 1, wherein the providing, to the vehicle, the indication of the travel restriction comprises providing the indication to a mobile device of a vehicle operator.

8. The method of claim 7, wherein the mobile device comprises a smart phone.

9. The method of claim 1, wherein the indication comprises a displayed indication.

10. The method of claim 9, wherein the displayed indication comprises instructions to a vehicle operator regarding the travel restriction.

11. A device, comprising:
a display screen;
a processor operatively coupled to the display screen; and
a memory that stores instructions executable by a processor to:
obtain a user identification of a vehicle passenger of an automated vehicle, wherein the vehicle passenger does not operate the vehicle;
obtain, based on the user identification, a travel restriction associated with a route for the vehicle and an indication of a trusted pickup to receive the vehicle passenger at an endpoint of the route, the travel restriction, trusted pickup, and the endpoint of the route being identified by a non-passenger of the vehicle;
provide, to a vehicle, an indication of the travel;
generate a travel plan for the vehicle based upon the travel restriction and the endpoint;
provide, to the non-passenger of the vehicle, a notification of arrival at the endpoint using the travel plan and pickup of the vehicle passenger by the trusted pickup wherein the non-passenger of the vehicle is located in a different location than the endpoint of the route and wherein the non-passenger is different from the trusted pickup; and
receive, responsive to arrival at the endpoint, an indication from the non-passenger of the vehicle to conclude the travel plan.

12. The device of claim 11, wherein the vehicle is an automated vehicle.

13. The device of claim 12, wherein the indication is for an automated vehicle.

14. The device of claim 13, wherein the instructions are executable by the processor to adjust a travel plan based on the restriction.

15. The device of claim 14, wherein the travel plan is adjusted by implementing a restriction selected from the group consisting of: restricting travel to a specific geographic area; restricting travel to a time window; restricting travel to a trip type; and restricting travel to a defined end point.

16. The device of claim 15, wherein the defined end point comprises a requirement for a predetermined individual being present at the end point.

17. The device of claim 11, wherein the processor executes instructions to provide, to the vehicle, the indication of the travel restriction by providing the indication to a mobile device of a vehicle operator.

18. The device of claim 17, wherein the mobile device comprises a smart phone.

19. The device of claim 11, wherein the indication comprises instructions to a vehicle operator regarding the travel restriction.

20. A system, comprising:
a non-transitory storage device comprising code that is executable by a processor, the code comprising:
code that obtains a user identification of a vehicle passenger of a vehicle, wherein the vehicle passenger does not operate the vehicle;
code that obtains, based on the user identification, a travel restriction associated with a route for the vehicle and an indication of a trusted pickup to receive the vehicle passenger at an endpoint of the route, the travel restriction, trusted pickup, and the endpoint of the route being identified by a non-passenger of the vehicle;
code that generates a travel plan for the vehicle based upon the travel restriction and the endpoint;
code that provides, to the non-passenger of the vehicle, a notification of arrival at the endpoint using the travel plan and pickup of the vehicle passenger by the trusted pickup, wherein the non-passenger of the vehicle is located in a different location than the endpoint of the route and wherein the non-passenger is different from the trusted pickup; and
code that receives, responsive to arrival at the endpoint, an indication from the non-passenger of the vehicle to conclude the travel plan.

* * * * *